United States Patent
Gupta et al.

(10) Patent No.: US 10,515,379 B2
(45) Date of Patent: Dec. 24, 2019

(54) COMPUTERIZED DETECTION AND SEMANTIC CHARACTERIZATION OF TRENDS IN DIGITAL MEDIA CONTENT

(71) Applicant: Adobe Inc., San Jose, CA (US)

(72) Inventors: Prakhar Gupta, Bangalore (IN); Nalam V S S Krishna Chaitanya, Chennai (IN); Debraj Basu, Thane (IN); Aayush Ojha, Lucknow (IN)

(73) Assignee: Adobe Inc., San Jose, CA (US)

( * ) Notice: Subject to any disclaimer, the term of this patent is extended or adjusted under 35 U.S.C. 154(b) by 122 days.

(21) Appl. No.: 15/384,639

(22) Filed: Dec. 20, 2016

(65) Prior Publication Data

US 2018/0174160 A1 Jun. 21, 2018

(51) Int. Cl.
*G06Q 30/00* (2012.01)
*G06Q 30/02* (2012.01)
*G06F 16/44* (2019.01)
*G06F 16/48* (2019.01)
*G06Q 10/00* (2012.01)

(52) U.S. Cl.
CPC ....... *G06Q 30/0201* (2013.01); *G06F 16/447* (2019.01); *G06F 16/489* (2019.01)

(58) Field of Classification Search
CPC . G06Q 10/00–50/00; G06F 1/00; G06F 21/00
USPC .............................. 705/7.11–7.42
See application file for complete search history.

(56) References Cited

U.S. PATENT DOCUMENTS

| | | | |
|---|---|---|---|
| 6,523,026 B1 * | 2/2003 | Gillis | G06F 16/3332 |
| 7,158,983 B2 * | 1/2007 | Willse | G06F 17/27 |
| 7,711,747 B2 * | 5/2010 | Renders | G06F 16/355 |
| | | | 707/771 |
| 7,752,200 B2 * | 7/2010 | Scholl | G06Q 30/02 |
| | | | 707/730 |
| 7,831,559 B1 * | 11/2010 | Mohan | G06F 16/30 |
| | | | 707/638 |

(Continued)

OTHER PUBLICATIONS

Pulla, Chandrika, Suman Karthik, and C. V. Jawahar. "Efficient semantic indexing for image retrieval." 2010 20th International Conference on Pattern Recognition. IEEE, 2010. (Year: 2010).*

(Continued)

*Primary Examiner* — Alan S Miller
(74) *Attorney, Agent, or Firm* — Kilpatrick Townsend & Stockton LLP

(57) ABSTRACT

A computer system stores digital media content such as images and video along with associated tags and timestamps. The system detects trends in the media content by semantic analysis which includes generation of a temporal tag graph that includes data indicative of a semantic representation of the tags over a plurality of time periods. The data in the tag graph is clustered to generate a set of identified trends reflected by the tags over the plurality of time periods. The set of identified trends is stored in data storage and is available for characterization which includes labeling of the trends, scoring the trends, evaluating changes in the trends over time, and identifying images representative of the detected trends. The temporal tag graph may take the form of a weighted undirected graph where each node in the graph is associated with one of the tags and the edges connecting the nodes represents a temporal correlation between the nodes associated with each edge.

20 Claims, 9 Drawing Sheets

(56) References Cited

U.S. PATENT DOCUMENTS

| | | | | |
|---|---|---|---|---|
| 7,890,512 | B2* | 2/2011 | Mei | G06F 16/58 707/737 |
| 8,145,677 | B2* | 3/2012 | Al-Shameri | G06K 9/0063 707/802 |
| 8,194,986 | B2* | 6/2012 | Conwell | G06K 9/228 382/224 |
| 8,630,975 | B1* | 1/2014 | Guo | G06N 7/005 707/608 |
| 8,775,409 | B1* | 7/2014 | Mehta | G06F 16/355 707/713 |
| 9,020,943 | B2* | 4/2015 | Caldwell | G06F 16/285 707/737 |
| 2004/0059736 | A1* | 3/2004 | Willse | G06F 17/27 |
| 2006/0229931 | A1* | 10/2006 | Fligler | G06Q 10/0639 705/7.38 |
| 2007/0185868 | A1* | 8/2007 | Roth | G06F 16/80 |
| 2007/0250468 | A1* | 10/2007 | Pieper | G06F 16/958 |
| 2008/0133488 | A1* | 6/2008 | Bandaru | G06F 16/951 |
| 2009/0313294 | A1* | 12/2009 | Mei | G06F 16/58 |
| 2011/0060983 | A1* | 3/2011 | Cai | G06F 16/9562 715/254 |
| 2011/0218960 | A1* | 9/2011 | Hatami-Hanza | G06F 16/00 707/603 |
| 2012/0110008 | A1* | 5/2012 | Pieper | G06F 16/958 707/769 |
| 2012/0114249 | A1* | 5/2012 | Conwell | G06K 9/228 382/190 |
| 2012/0190404 | A1* | 7/2012 | Rhoads | G06K 9/228 455/556.1 |
| 2012/0311496 | A1* | 12/2012 | Cao | G06F 16/287 715/821 |
| 2013/0132366 | A1* | 5/2013 | Pieper | G06F 16/9535 707/710 |
| 2014/0188780 | A1* | 7/2014 | Guo | G06N 7/005 706/52 |
| 2015/0128162 | A1* | 5/2015 | Ionescu | H04N 21/6125 725/14 |

OTHER PUBLICATIONS

Ma, Hao, et al. "Bridging the semantic gap between image contents and tags." IEEE Transactions on Multimedia 12.5 (2010): 462-473. (Year: 2010).*

Heisterkamp, Douglas R. "Building a latent semantic index of an image database from patterns of relevance feedback." Object recognition supported by user interaction for service robots. vol. 4. IEEE, 2002. (Year: 2002).*

Zhang, Xiaoming, et al. "Social image tagging using graph-based reinforcement on multi-type interrelated objects." Signal Processing 93.8 (2013): 2178-2189. (Year: 2013).*

Wu, Jiangning, Zhaoguo Xuan, and Donghua Pan. "Enhancing text representation for classification tasks with semantic graph structures." International Journal of Innovative Computing, Information and Control (ICIC) 7.5 (2011). (Year: 2011).*

Xie, Lexing, and Xuming He. "Picture tags and world knowledge: learning tag relations from visual semantic sources." Proceedings of the 21st ACM international conference on Multimedia. ACM, 2013. (Year: 2013).*

Urban, Jana, and Joemon M. Jose. "Adaptive image retrieval using a graph model for semantic feature integration." Proceedings of the 8th ACM international workshop on Multimedia information retrieval. ACM, 2006. (Year: 2006).*

David M Blei, Andrew Y Ng, and Michael I Jordan. Latent dirichlet allocation. Journal of machine Learning research, 3 (Jan):993-1022,2003.

Wu Chun-Che, Mei Tao, H. Hsu Winston, and Rui Yong. Learning to personalize trending image search suggestion. SIGIR, 2014.

Yu Dongfei, Tian Xinmei, Mei Tao, and Rui Yong. On the selection of trending image from the web. ICME, 2015.

Chen Fang, Hailin Jin, Jianchao Yang, and Zhe Lin. Collaborative feature learning from social media. In the IEEE Conference on Computer Vision and Pattern Recognition (CVPR), Jun. 2015.

Yunchao Gong, Qifa Ke, Michael Isard, and Svetlana Lazebnik. A multi-view embedding space for modeling internet images, tags, and their semantics. International Journal of Computer Vision, 106(2):210-233,2014.

Daniel Ramage, David Hall, Ramesh Nallapati, and Christopher D Manning. Labeled lda: A supervised topic model for credit attribution in multi-labeled corpora. In Proceedings of the 2009 Conference on Empirical Methods in Natural Language Processing: vol. 1-vol. 1, pp. 248-256. Association for Computational Linguistics, 2009.

Myra Spiliopoulou, Irene Ntoutsi, Yannis Theodoridis, and Rene Schult. Monic: Modeling and monitoring cluster transitions. In Proceedings of the 12th ACM SIGKDD International Conference on Knowledge Discovery and Data Mining, KDD '06, pp. 706-711, New York, NY, USA, 2006. ACM.

Stijn Marinus Van Dongen. Graph clustering by flow simulation. 2001.

Junjie Yao, et al, "Detecting Bursty Events in Collaborative Tagging Systems", ICDE Conference 2010, Apr. 2010, 4 pages.

Michael Mathioudakis, et al, "TwitterMonitor: Trend Detection over the Twitter Stream", Stamford Jan. 2010, 3 pages.

He, Ruining, et al., "Ups and Downs: Modeling the Visual Evolution of Fashion Trends with One-Class Collaborative Filtering" Proceedings of the 25th International Conference on World Wide Web Apr. 2016, 11 pages.

* cited by examiner

COMPUTERIZED DETECTION AND SEMANTIC CHARACTERIZATION OF TRENDS IN DIGITAL MEDIA CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to the field of data processing and more particularly to detection and semantic characterization of information pertaining to digital media content.

BACKGROUND

Generation and storage of digitally encoded creative content, such as images, illustrations, videos, is rapidly growing. Along with such growth is a growing interest in identifying creative content of interest for commercial and artistic purposes. For example, creators of content need to understand the content that is desired, and consumers of such content, for example marketers and advertisers, need to discover talent and buy content for their brand and websites. The challenge to both creators and consumers of creative content increases with the large number of creative content being uploaded. Current solutions tend to be time consuming and tedious. Accordingly, there is a need for improved computerized methods and systems to identify digitally encoded content of interest to creators and consumers of such content.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

Figure 1:
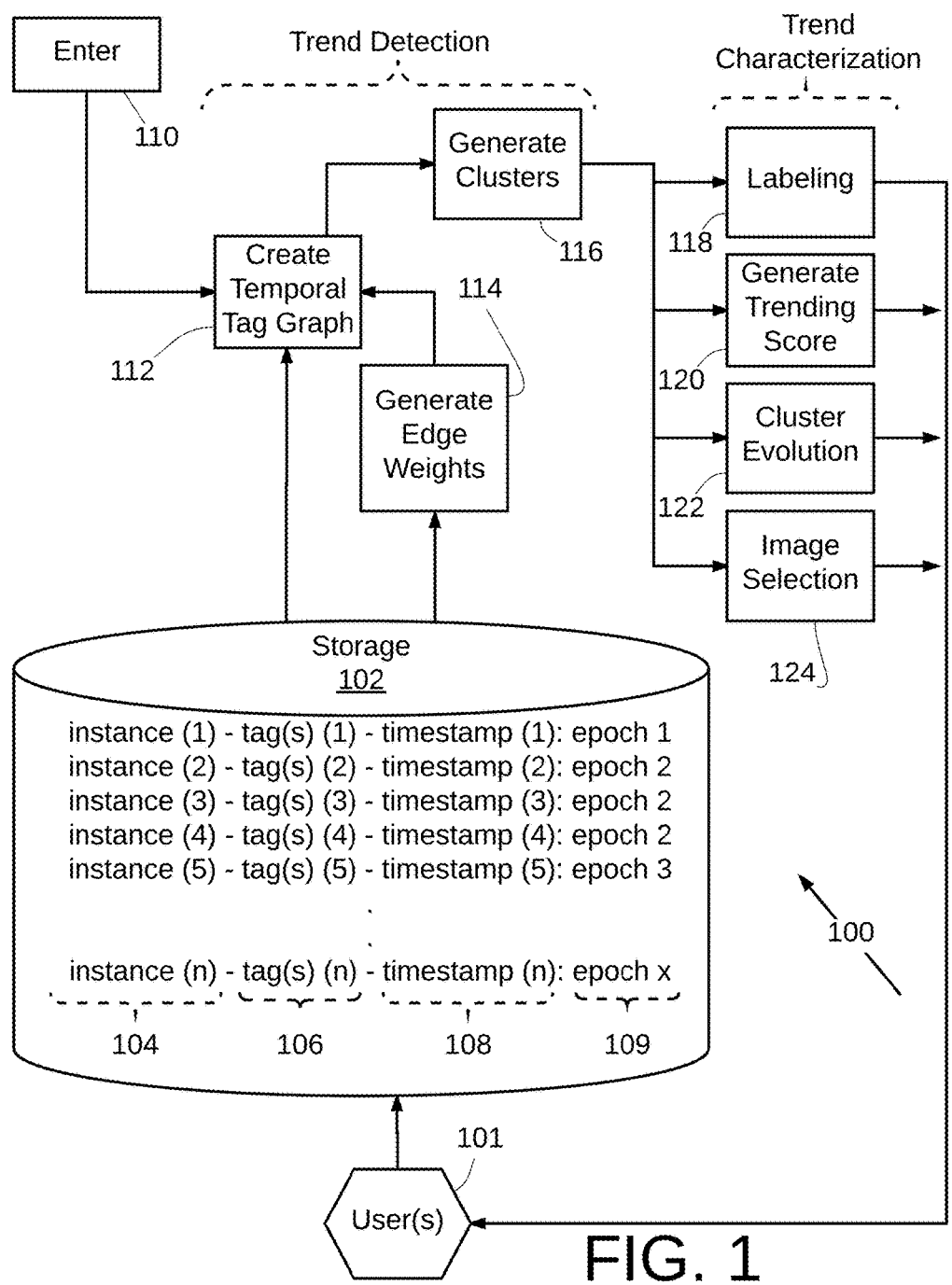
FIG. 1 is a high level flowchart illustrating trend detection and characterization in accordance with embodiments of the invention.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The systems and methods disclosed herein permit users, such as content creators as well as content consumers such as marketers or advertisers, to discover creative trends in digitally encoded content so that they can identify trends of interest. Marketers and advertisers can discover and buy digitally encoded content for their brand and websites. Given choices from millions of images and video files, it becomes overwhelming to decide what concept, visual or image one can choose for marketing. Marketers and advertisers also need to stay on top of new multimedia trends, which arise due to current affairs so that they can share similar values and ideas, and demonstrate support for causes with their audience. Creatives similarly want to be up to pace with the trends in the creative community. For that, they need to know what other creatives are creating and uploading, as well as what the users of creative platforms are searching and downloading, to make their work known to the world's leading creative community. Knowing what is in demand and trending in the creative community can help them create and position their work to gain the maximum impact and land creative jobs. Also, every now and then, creatives might get stuck on what to do next. In such cases, it will be helpful if they get inspiration and new ideas for their new work.

A trend, as referred to herein, is generally understood to be a general direction in which something is developing or changing. A creative trend can be an artistic style, a design, a concept or even a world event which is developing or changing, such as for example, becoming popular as compared to its long term usage, or conversely, unpopular. When something becomes popular, it is reflected in the uploads and downloads on sites such as those of stock photography and media sharing. With the increasing rate at which digitally encoded content is being developed and shared, it is desirable to quickly understand trends reflected in the content. This content may take a variety of forms including images, video, text, animations and different combinations of the foregoing. Manual identification of trends in digital content is not a feasible solution given the volume of such content and the rapid pace at which it changes. Moreover, manual identification is highly subject and error prone. Computerized algorithmic detection of changes to data is used in various environments such as in social networks but does not work adequately with digitally encoded creative content.

The computerized methods and systems disclosed herein address the foregoing challenges by automatically detecting trends from media content and associated tags, and providing semantic and contextual characterization for the detected trends in order to make the trends easily comprehensible. The systems and methods disclosed herein improve the operation of computer systems by permitting such systems to identify for users, relevant content from potentially millions or billions of individual instances of media content (e.g. individual pictures, videos or a combination thereof). Among other benefits, the disclosed systems and methods permit rapid understanding of trends embodied in digitally encoded media content. Moreover, the trend identification may be performed on multiple types of creative content, such as images, video, text, animations and different combinations thereof, irrespective of the manner in which such content is encoded. The disclosed systems and methods thereby provide a solution to the increasing difficulty, which is unique to computerized media content, that is encountered of identifying trends in the increasing volumes of digitally encoded content which are being generated and shared with increasing frequency.

For example, a computer implemented method for detecting one or more trends in media content is disclosed. Tags associated with the media content are retrieved from data storage. The media content includes a plurality of instances of media content and each tag is associated with an instance of the media content. Each tag contains user generated information indicative of content within the associated instance of media content. Semantic analysis of the retrieved tags is performed by generating a temporal tag graph which includes data indicative of a semantic representation of the tags over a plurality of time periods. The data in the temporal tag graph is then clustered to generate a set of identified trends that is reflected by the tags over the plurality of time periods. The identified trends are stored to data storage and are available for display and characterization by a variety of user selectable techniques. The characterization options include automated generation of labels for each trend, automated scoring of each trend, categorization of the trends into a plurality of categories, automated selection of one or more images indicative of each of the trends and identification of the evolution of the trends over time such as when they emerge, disappear, split into multiple new trends or when two or more trends merge into a single trend.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

FIG. 1 is a high level flowchart illustrating trend detection and characterization in accordance with embodiments of the invention. In FIG. 1, a computer system, shown generally at 100, includes digital storage 102 that stores media content, shown generally at 104, tags 106, and timestamps 108, and a processor (shown in FIG. 6) that performs steps 110-124. Digital storage 102 is shown generally but can take a variety of forms of storage for digital content including storage that is spread physically across numerous storage devices and also that is partially or wholly distant physically from other portions of system 100.

Media content 104 includes a plurality of instances of content, shown as instance (1)-instance (n). Such content may be encoded in a variety of formats and may represent still images or video, or combination thereof and may include other types of content such as text. The media content 104 may be entered into system 100 by one or more user(s) 101. Such users are typically located remotely from system 100 and interact with system 100 via an internet connection. For example, user(s) 101 may upload content 104 such as photographs and/or video and provide one or more tag(s) 104 with each instance of uploaded content (e.g. picture and/or video), such as in a manner permitted by Adobe Behance™ or Adobe Stock™ available from Adobe Systems, Inc. System 100 may be used by a large number of users and storage 102 may therefore contain large volumes of content.

With any instance of content, there is associated a timestamp 108 automatically generated by system 100 and there may be associated one or more tags 106, shown as tags (1)-tag(s) (n). Such tags are typically user generated and in one embodiment are textually encoded. Other forms of encoding the tags may also be employed. For example, a user may upload to system 100 a picture of for example a dog and include the tag "dog". The user may also include the more generalized tags of "pet" and "animal", and the more specialized tag of "Labrador Retriever." If the picture is taken at say a holiday such as July 4, then the user may also include one or more of the following tags: "holiday, "July 4", "summer". Tags indicating geography, weather and other aspects may also be included. Tags that are manually generated by users, which is common, have a high degree of variation among users and even among the same user. For example, a user may provide a large number of tags that are highly descriptive for one instance of media content and provide few or no tags for other instances of media content. Additionally, it is not uncommon for two users to provide different tags for similar content due to different perspectives, time constraints, etc. Tags that are machine generated may also be quite varied in specificity and accuracy due to differences in the algorithms for generating such tags.

Embodiments disclosed herein detect trends over a period of time, which includes a plurality of segments of time, each segment referred to herein as an epoch, shown at 109, with each epoch representing a period of time. For example, an epoch may represent content with time stamps within a 24-hour period. As seen in FIG. 1, instance (1) of content 104 is assigned by system 100 to epoch 1, instances (2)-(4) are assigned to epoch 2 and instance (5) is assigned to epoch 3. So, content uploaded to the system 100 with time stamps on for example, a particular calendar day (e.g. Monday, Oct. 3, 2016) will be grouped together into a single epoch. Content uploaded on the following day (e.g. Tuesday, Oct. 4, 2016) will be grouped together into another epoch, and so forth. The period of time represented by an epoch is not limited to a 24-hour period and can be changed. For example, the period of time represented by an epoch may be shortened when data is being entered at more rapidly, at a higher frequency, and may be lowered when data is being entered more slowly, at a lower frequency.

Trend detection may be initiated at step 110 either automatically, perhaps periodically at preset times, or upon upload into storage 102 of a certain amount of content, or may be manually initiated either by a system administrator or by a user, providing one or more inputs to system 100. In general, trend detection, steps 112-116, is performed by creating a temporal tag graph, step 112, and clustering it, step 116. The temporal tag graph preferably takes the form of a weighted undirected graph with tags 106 as the nodes. An undirected graph is one in which edges have no orientation, in other words, edge (x, y) is identical to edge (y, x), i.e., they are not ordered pairs, but sets {x, y} (or 2-multisets) of vertices. The graph is preferably weighted in accordance with an edge weighting measure, generated at 114, that is representative of frequency of usage signified from N(x,y), in other words, the number of times tags x and y have been used together and at the same time an association between two tags. Tags which have been used together more often compared to being used separately, will get more edge weights. Also tags having similar time series will get more edge weights.

$$E(x, y) = N(x, y)\log\left(1 + \frac{(1+\rho)p^2(x, y)}{p(x)p(y)}\right)$$

where,
$p(x,y)$ is the probability of co-occurrence of two different tags x,y in the current epoch.
$p(x)$, $p(y)$ are the probabilities of occurrence of corresponding tags, x and y in the current epoch.
$N(x, y)$ is the count of co-occurrence of tags x, y in the current epoch.
$x_i$ and $y_i$ are the counts of occurrences of the tags in all projects or images in $i^{th}$ epoch.
and $$\rho = \frac{cov(x, y)}{\sigma_x \sigma_y} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

$\rho$ is the Pearson Correlation coefficient of time series of the frequency of tags over the last few epochs, as specified by the variable n. The value $1+\rho$ shows the correlation between tags x and y over the past two epochs. This operates to model the co-occurrence of two tags in the last two epochs.

$$\frac{p^2(x, y)}{p(x)p(y)}$$

represents how related the tags together are in the current epoch whereas $N(x, y)$ describes the number of times tags x and y occur together in the current epoch.

The edge weight generated at 114 advantageously includes the Pearson Correlation coefficient to also incorporate the correlation of the two tags over the last n epochs and is not just limited to co-occurrence in the current epoch. This operates to signify the time series correlation, in other words correlation of two tags over multiple segments of time. This is done after performing a differencing operation over the time series of the two tags, which improves the association term. This is an advantage over employing a basic edge weight which is simply the count of projects (i.e. creative fields) in which two tags x and y occur together. Giving more weight to $p(x,y)$ inside the logarithm, which is the co-occurrence probability term in the mutual information variant, operates to correct the bias of Pointwise Mutual Information (PMI) towards low frequency occurrences and operates to boost the scores of frequent pairs. The PMI of a pair of outcomes x and y belonging to discrete random variables X and Y quantifies the discrepancy between the probability of their coincidence given their joint distribution and their individual distributions, assuming independence.

The temporal tag graph generated at 112 not only models related tags (i.e. whether x is related to y or not) with edges but also incorporates the contextual information between them in the current epoch through the edge weight. This makes the obtained clusters represent the trend more intuitively and covers the contextual information between tags obtained in a cluster.

At 116, the system 100 employs the temporal tag graph generated at 112 to generate creative trends by performing clustering on the tag graph to identify groupings of tags. These identified groupings of tags are recognized as trends 117 and are stored as one or more data structures to storage 102 for subsequent retrieval and further processing. The trends 117 may also be displayed to user(s) 101 which may include employing the trend characterization techniques described herein. As can be seen, embodiments disclosed herein identify trends by semantically grouping tags within an identified time period and across multiple time periods. The grouping advantageously takes into account relationships between tags as well as associated contextual information. Disclosed embodiments employ either Spectral or Markov Clustering algorithms on the tag graph to generate clusters which represent trends. For Spectral Clustering the data structure may take the form of a symmetric matrix which is generated with co-occurrence as the weights on which spectral clustering is performed. This provides moderately coherent clusters with numerous general clusters. Such clusters are described by Yu Dongfei, Tian Xinmei, Mei Tao, and Rui Yong, in "On the selection of trending image from the web" *ICME*, 2015.

A Markov Clustering Algorithm which uses flow simulation in a graph to find clusters may also be employed. Such an algorithm is described by Stijn Marinus Van Dongen in "Graph clustering by flow simulation", 2001, Centrum Wiskunde & Informatica, Science Park 123, 1098 XG Amsterdam, Netherlands. As explained by Van Dongen, the Markov cluster process defines a sequence of stochastic matrices by alternation of two operators on a generating matrix. The Markov cluster process is suited to identify clusters in graphs where dissimilarity between vertices is implicitly defined by the connectivity characteristics of the graph. Such an algorithm employs expansion and inflation parameters. An expansion parameter allows the edge density to flow through neighboring nodes thus connecting the farther parts of the graph. On increasing the expansion parameter, the links to farther nodes are strengthened and consequently the cluster size increases and the number of clusters decreases. An inflation operation is applied between two expansions where it changes the edge weights by making strong edges stronger and the weak edges weaker, thereby eliminating weak links slowly. When the inflation parameter is increased, the cluster size decreases as it penalizes the weaker edges, thereby making it difficult for the edge weight to flow through to neighboring nodes thus not connecting more parts of the graph. This decrease in the size of the clusters increases the total number of clusters.

Figure 7A:
FIGS. 7A, 7B, and 7C are pictorial diagrams illustrating an example of a user interacting with an embodiment.
Figure 7B:
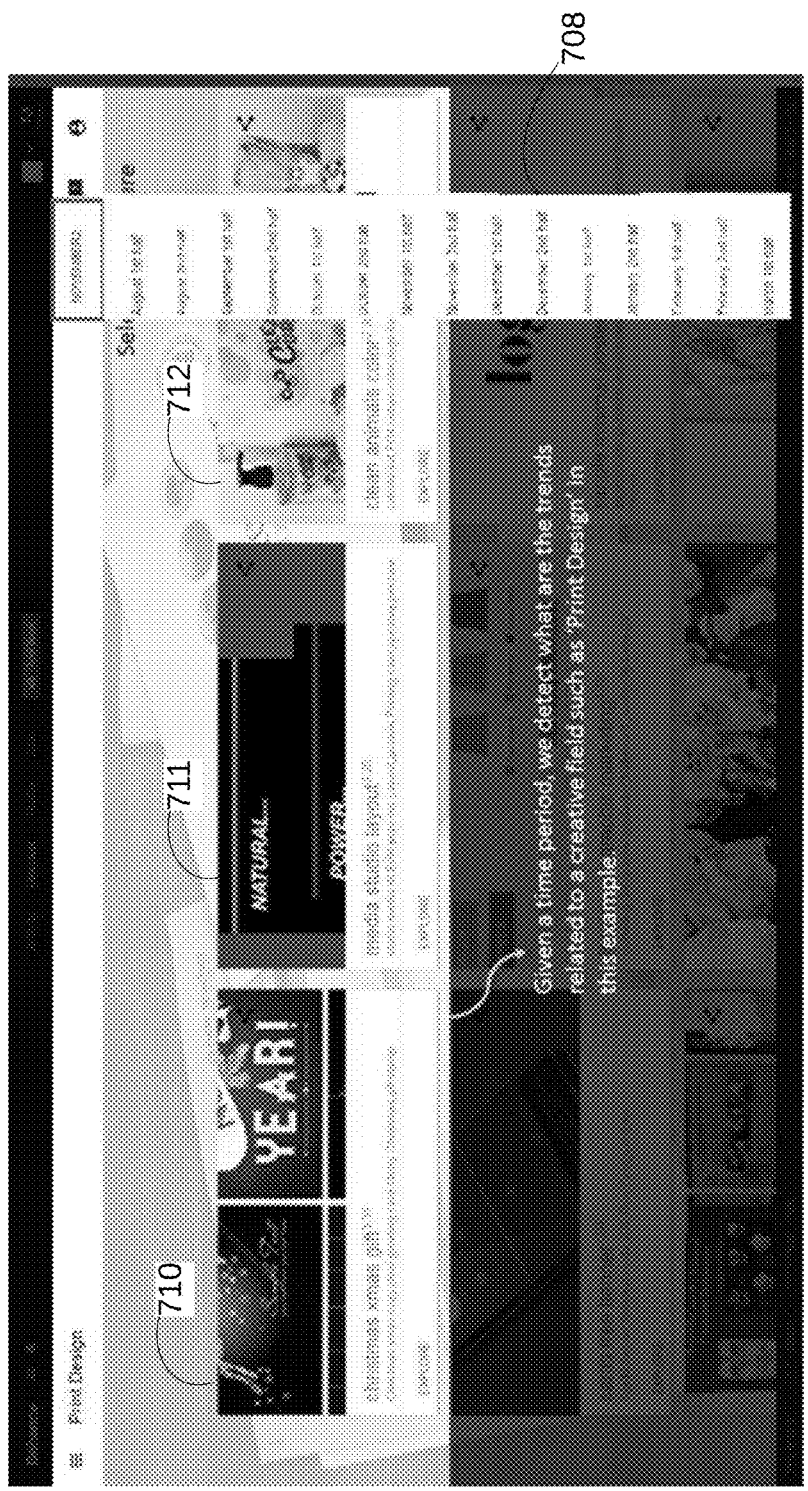
Figure 7C:
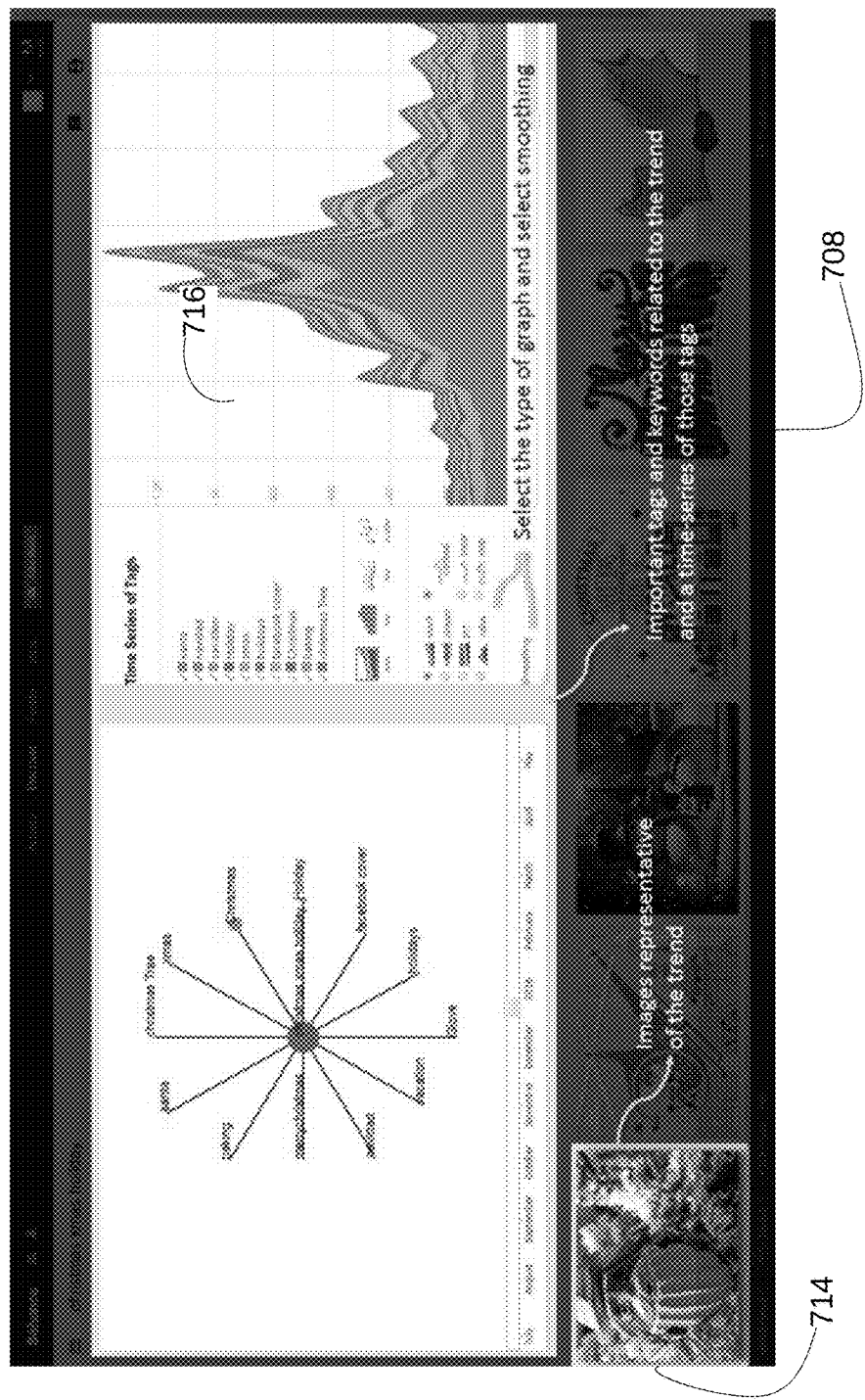

The output of the Markov clustering algorithm is a set of identified trends 117 that may be stored in the form of a data structure which takes the form of one or more stochastic matrices. The trends 117 may then be characterized by retrieving the trends 117 from storage 102 and performing cluster labeling 118, generation of trending scores 120, analyzing how clusters evolve 122, and selection of images for a trend 124. The outputs of the operations at 118, 120, 122 and 124 may be provided to one or more user's 101 in a variety of ways. For example, a user 101 may provide inputs to system 100 to view the outputs of operations 118, 120, 122, and/or 124. Alternatively, the outputs may be provided to a user upon, for example, logging into their account on system 100. Further details of how the user may interact with the system 100 are shown in FIGS. 7A, 7B, and 7C and the accompanying description.

Figure 2:
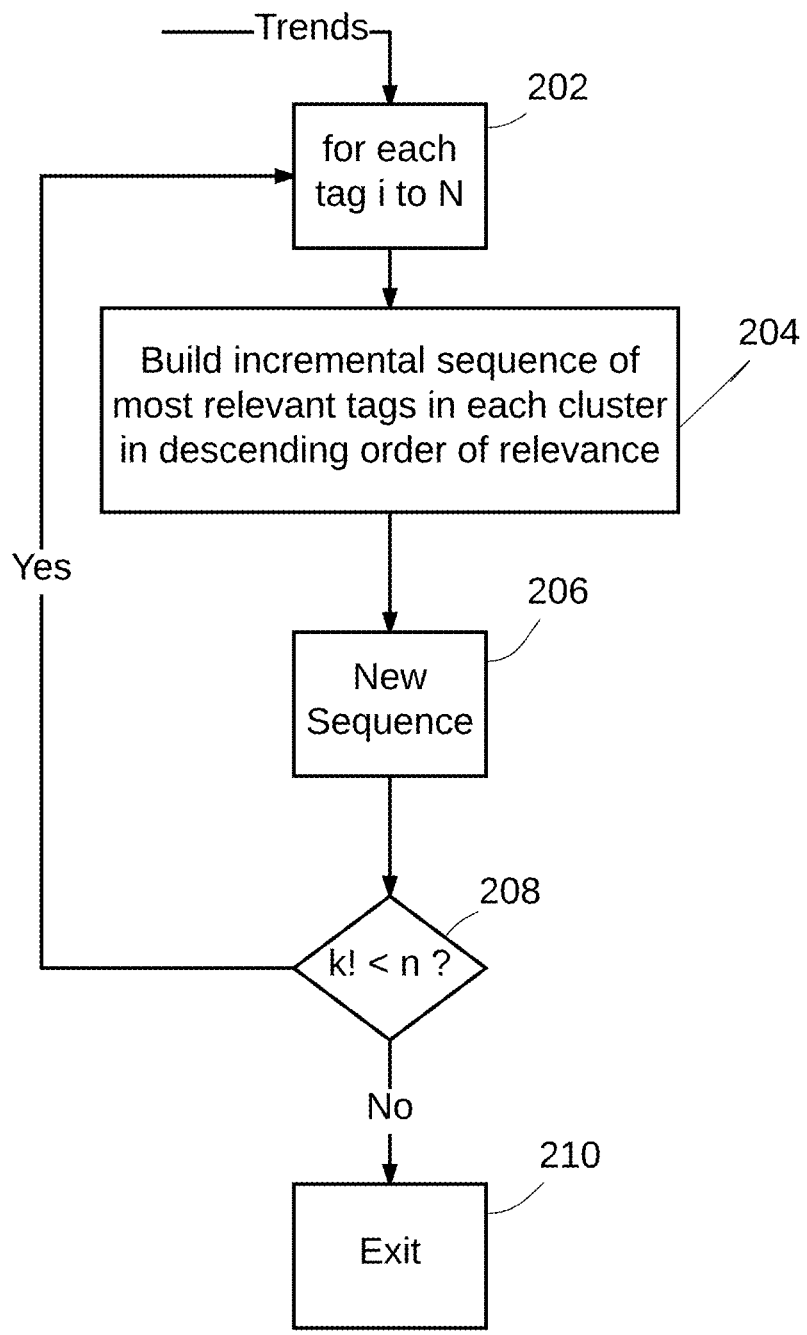
FIG. 2 is a flowchart illustrating further details of an embodiment of trend labeling.

FIG. 2 is a flowchart illustrating further details of an embodiment of trend labeling 118. A metric referred to as Tag Relevance is employed and represents an importance score of a tag to a cluster. Tag Relevance is a variant of Term frequency-Inverse Document Frequency (Tf-Idf) for documents with words and is a numerical statistic that is intended to reflect how important a word is to a document in a collection or corpus. The value of Tf-Idf increases proportionally to the number of times a word appears in the document, but is offset by the frequency of the word in the corpus, which helps to adjust for the fact that some words appear more frequently in general. Here, more specifically, Tag Relevance is assumed to be suitable to a context of clusters which contain tags and clustering in an epoch which contains multiple clusters. Tag Frequency (Tf) is defined as:

$$TagFrequency, Tf_{c_i^t}(x_l) = \frac{freq^t(x_l)}{\sum_{j=1}^{|c_i^t|} freq^t(x_j)}$$

where, $Tf_{c_i^t}(x_l)$ represents the Tf of tag $x_l$ in $i^{th}$ cluster in $t^{th}$ epoch $$InverseClusterFrequency, Icf(x_l) = \log\left(1 + \frac{N}{freq^t(x_l)}\right)$$

where,
N is the count of projects in the current epoch.

This can be better understood by taking the analogy with Tf-Idf as generally understood, and explained above, as the clustering at epoch time t in a corpus of documents where each document is analogous to a cluster in the clustering. The frequencies of tags are taken as the count of projects in which tags occur in the current epoch, which is analogous with the frequency of a word in a document, and N is count of projects in the epoch instead of count of documents in the corpus. The pseudo-code below implements the steps shown in FIG. 2.

Trend Labeling

---
INPUT= n, trend cluster (i.e. sequence of tags $X_1X_2...X_k$ ranked with tag relevance score)
OUTPUT= trend name
1:  procedure TREND-LABELING
2:      for each tag i ∈ N do
3:          Insert i between $m^{th}$ and m + $1^{th}$ tag such that
            l = arg$_m$maxP ($X_1X_2...X_m$, W, $X_{m+1}...X_k$)
4:          New Sequence = $Y_1Y_2...Y_{k+1}$, k = k + 1
5:      Repeat from step 2 till k! = n
6:      end for
7:  end procedure
Copyright 2016 Adobe Systems Inc.

---

The characterization process relies on naming, or labeling, the detected trends. This is performed by building an incremental sequence, steps 202, 206, 208, of the most relevant tags in each cluster in descending order of relevance, step 204. In each iteration, the best permutation is chosen by using joint probability of the sequence which is calculated by using a trained language model over a large enough corpus. The Microsoft Web Language Model API, available from Microsoft Cognitive Services, Microsoft Corp., may be used for such a calculation. The algorithm first selects the tag having highest tag relevance. Then for all the next tags ranked according to tag relevance, it detects a best possible position between the tags already selected which gives the maximum joint probability and inserts the tag in that position. The result is provided to a user 101 at 210.

Figure 3:
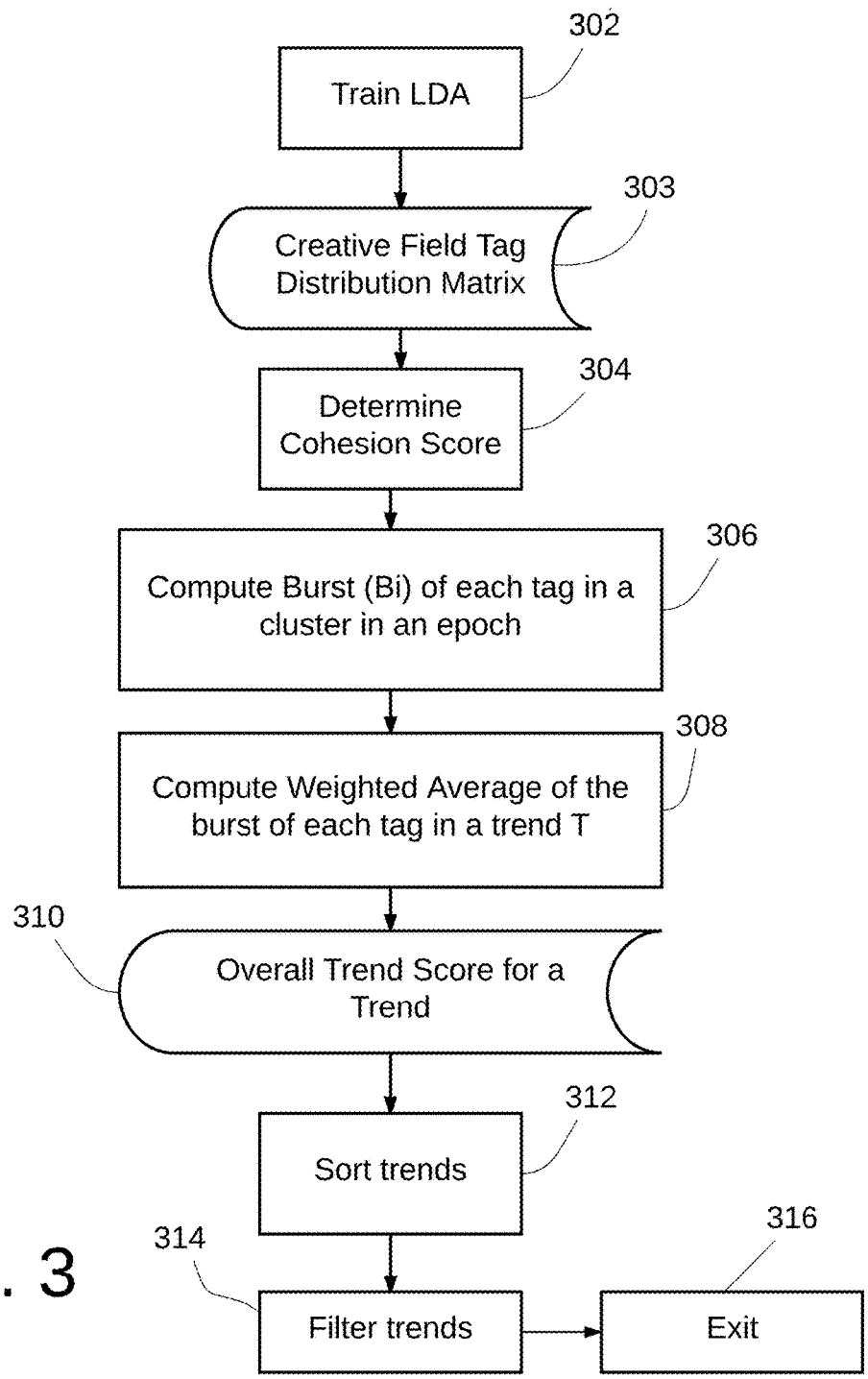
FIG. 3 is a flowchart illustrating operation of an embodiment of semantic trend characterization.

The steps performed for semantic trend categorization are illustrated in FIG. 3. Categorizing trends based on creative fields or topics can help users analyze and provide better insight of what a cluster is about. These categories can be user given or curated. Examples of such categories include, but are not limited to the following: architecture, art direction, branding, fashion, graphic design, illustration, industrial design, interaction design, motion graphics, photography, UI/UX, print design, pattern design, web design.

A variant of a Latent Dirichlet Allocation (LDA) model, known as Labeled LDA is employed to identify creative fields that are relevant to a trend. Various aspects of Labeled LDA are described by Daniel Ramage, David Hall, Ramesh Nallapati, and Christopher D Manning in "Labeled lda: A supervised topic model for credit attribution in multi-labeled corpora", *Proceedings of the* 2009 *Conference on Empirical Methods in Natural Language Processing: Volume* 1-*Volume* 1, pages 248-256, Association for Computational Linguistics, 2009.

Labeled LDA is a topic model which is an extension of traditional LDA, as described by David M Blei, Andrew Y Ng, and Michael I Jordan in "Latent dirichlet allocation", *Journal of machine Learning research*, 3 (January):993-1022, 2003. LDA is a generative statistical model (i.e. a model for randomly generating observable data values) that allows sets of observations to be explained by unobserved, or latent, groups to explain why some parts of the data are similar. For example, if observations are words collected into documents, LDA posits that each document is a mixture of a small number of topics and that each word's creation is attributable to one of the document's topics. Labeled LDA allows topic models to be trained with labeled documents, where a document can have multiple labels. It constrains LDA by defining a correspondence between LDAs latent topics and user tags. By doing this, Labeled LDA learns word-tag correspondences directly. Sampling of topics for each document is restricted only to the set of labels assigned to the document. As an example, a dataset of 60-70 creative fields can be used into which each project is categorized, with a project belonging to possible multiple categories. Such a dataset can be used to train a supervised Latent Dirichlet Allocation model which yields a creative field-tag distribution matrix that is indicative of a probability distribution of the tags for a particular creative field. For example, if a tag is "animal", and the creative field is "photography", the corresponding cell in the distribution matrix will signify the probability of the "animal" tag in the creative field of "photography".

The steps in FIG. 3 may be initiated automatically, or upon user input. As seen in FIG. 3 at 302, the Labeled LDA model is trained using all the images and tags present in the database, and can be retrained whenever a fixed number of new images are added, and the set of tags of an image corresponds to a document and the creative fields of the image are the set of labels for the image. Each document d is represented by a tuple consisting of a set of tag words $t^{(d)}=(t_1, t_2, \ldots t_{N_d})$ and has a set of labels $l^{(d)}=(l_1, l_2, \ldots l_{M_d})$, where labels correspond to user assigned created fields to an image. Each weight, $w_i \in \{1, \ldots, V\}$ and each label $l_i \in \{1, \ldots, L\}$. Here, $N_d$ is the document length and $M_d$ is the size of the set of labels for the document d, V is the set of the tags in the corpus, and L is the set of unique labels in the corpus. The model generates multinomial topic distributions over vocabulary $\beta_k=(\beta_{k,1}, \ldots, \beta_{k,v})T\sim Dir(\cdot|\eta)$ for each topic k, from a Dirichlet prior $\eta$. It draws a multinomial distribution $\Theta^{(d)}$ over their labels which indicates the relevance of a creative field for each document. A tag distribution matrix M, 303, is created, where the rows represent the tags and columns the labels. The cells in a column represent the distribution of the label over all tags.

To find creative fields (i.e. categories) relevant for a trend, the trained labeled LDA model is used to obtain a score, named cohesion score, step 304, for all creative fields. The cohesion score between a trend T and a creative field L is calculated by calculating average cosine similarity over all tags in a trend using the tag distribution matrix as shown in the equation below, where p(l) is the value obtained from the tag distribution matrix, and p(t) is the normalized tag relevance in a trend. Creative fields with a cohesion score greater than a predetermined threshold are assigned to the trend.

$$CohesionScore(T, L) = \frac{1}{2} \sum_{t \in T} \sum_{l \in L} \frac{p(t) \cdot p(l)}{\|p(t)\| \cdot \|p(l)\|}$$

At any point in time, there exists a set of trends T, which are ranked and filtered in a manner such that the trends having the more increase in usage as compared to their long term use and also usage higher than other trends are more highly ranked. At 306, a burst value (Bi) is computed of each tag in a cluster in an epoch, which is defined as max ($f_i-\mu$, 0). $f_i$ is the frequency of occurrence of the tag in the current epoch and $\mu$, is computed as an average of $f_i$ over the prior few (2-3) epochs. At 308, a weighted average of the burst of each tag in a trend (T) with the tag relevance values as the weights is computed. This provides an overall trend score 310 for a trend based on its relevant trending tags. The calculation of the trend score, Score(T), can be represented as follows:

$$Score(T) = \frac{\sum_{i=1}^{N} B_i Rel_i}{\sum_{i=1}^{N} Rel_i}$$

At 312, the trends are sorted based on their trend score and at 314 the sorted trends are filtered by employing a threshold h to filter the trends for an epoch to obtain a set of high popularity relevant trends. The routine exits at 316 where the result is provided to user(s) 101.

Figure 4:
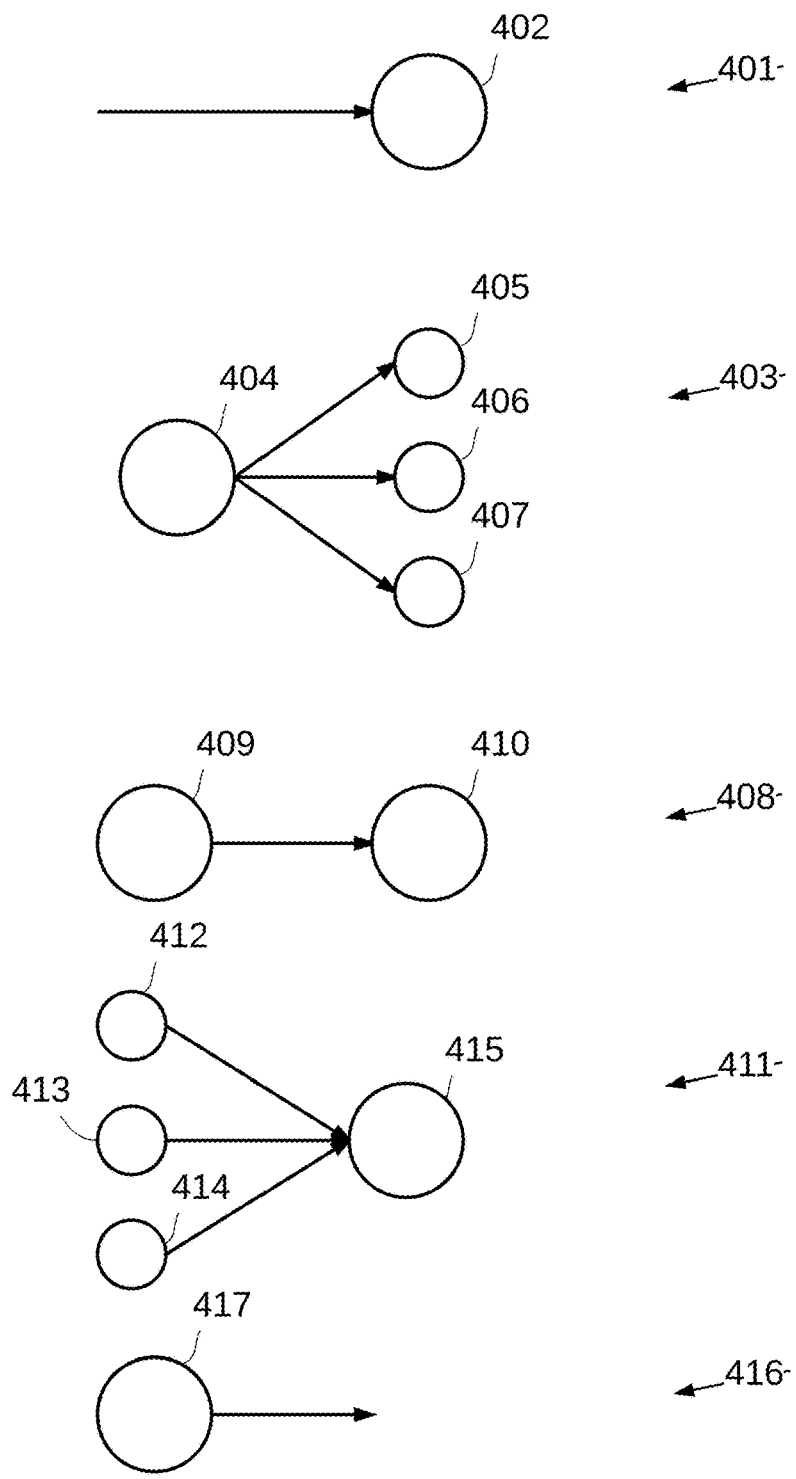
FIG. 4 is an illustration of categorization of evolutions between clusters.

Apart from finding and characterizing trends, it is also important to see how the trends are evolving over time, that is, to find the temporal relatedness between two trends of contiguous epochs t and t−1. An evolution relationship between contiguous epochs can be broadly classified into five ways, as illustrated in FIG. 4. They are:
- at 401: Emerging—a new cluster 402 is identified.
- at 403: Splitting—a cluster 404 is split into two or more clusters, 405, 406, 407.
- at 408: Surviving—a cluster 409 survives in the new epoch as a cluster 410
- at 411: Absorbing—two or more clusters 412, 413, 414 merge into a single new or existing cluster 415
- at 416: Dying—a cluster 417 is eliminated in the new epoch A modified version of a monic algorithm may be employed to identify the transitions between clusters illustrated in FIG. 4. An example of a monic algorithm is disclosed by Myra Spiliopoulou, Irene Ntoutsi, Yannis Theodoridis, and Rene Schult in "Monic: Modeling and monitoring cluster transitions", Proceedings *of the* 12*th ACM SIGKDD International Conference on Knowledge Discovery and Data Mining*, KDD '06, pages 706-711, New York, N.Y., USA, 2006, ACM. Clusters from two epochs are selected and run through the modified monic algorithm which generates similarity metrics between clusters. Depending on the given similarity threshold it gives output of different type of clusters. Different similarity metrics between clusters may be employed, including:
- Jaccard Index: uses binary similarity between words and employs intersection between two trend clusters.
- Cosine similarity: computed between the Tf-Icf vector of two trend clusters.
- Soft cosine similarity: with WordNet® similarity which is not binary, where the Tf-Icf serve as weights for each tag in a cluster.

The soft cosine similarity metric may be generated in accordance with the following equation.

$$softcosine(p, q) = \frac{\sum_{i=0}^{n} \sum_{j=0}^{m} s_{ij} a_{pi}^t b_{qj}^{t+1}}{\left(\sum_{i=0}^{n} \sum_{j=0}^{n} s_{ij} a_{pi}^t a_{pj}^t\right)\left(\sum_{i=0}^{m} \sum_{j=0}^{m} s_{ij} b_{qi}^{t+1} b_{qj}^{t+1}\right)}$$

where,
- $a_p^t$ and $b_q^{t+1}$ are the tag relevance vectors of $p^{th}$ and $q^{th}$ clusters in $t^{th}$ and $t+1^{th}$ epoch respectively.
- $a_{p_i}^t$ is the $i^{th}$ tag of $p^{th}$ cluster in $t^{th}$ epoch.
- $s_{ij}$ is the semantic similarity between words i and j which is obtained from a lexical database such as the WordNet® corpus, available at Princeton University "About WordNet." WordNet. Princeton University. 2010. <http://wordnet.princeton.edu>. As noted at the aforementioned URL: "WordNet superficially resembles a thesaurus, in that it groups words together based on their meanings. However, there are some important distinctions. First, WordNet interlinks not just word forms—strings of letters—but specific senses of words. As a result, words that are found in close proximity to one another in the network are semantically disambiguated. Second, WordNet labels the semantic relations among words, whereas the groupings of words in a thesaurus does not follow any explicit pattern other than meaning similarity."

The soft cosine similarity metric has the advantage of not being binary, which addresses the cases where two words need not be exactly the same but they can be related to be deemed similar, and thereby identifies the gradual evolution of trends over time.

To show trends to users it is useful to provide representative images for trends as well as the techniques shown at 118, 120, and 122. Showing representative images for a trend can help a user better understand the trend. As referred to herein, a trend is a bursty cluster of tags, meaning that the trend score is relatively high for the trend. In the case of user created tags for images, the tags may contain incorrect information, and important tags may be missing. Consequently, to handle such missing and faulty information, it is better to incorporate both tag as well as image features in selection of representative images.

Figure 5:
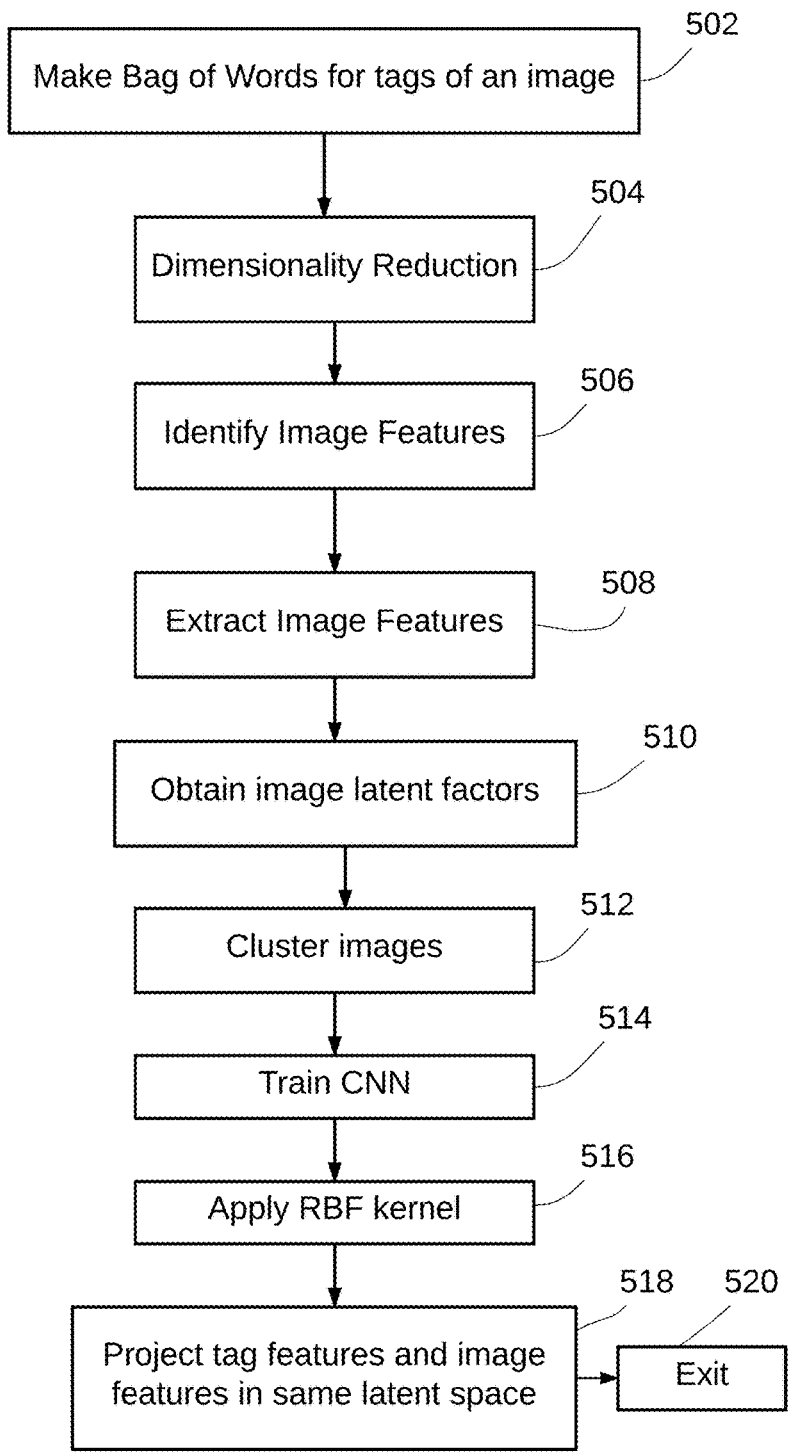
FIG. 5 is a flowchart illustrating operation of an embodiment of image selection.

FIG. 5 is a flowchart illustrating operation of an embodiment of image selection. In the embodiment shown in FIG. 5, image feature detection is performed using a technique known as Kernalized Canonical Correlation Analysis (KCCA), as described by Yunchao Gong, Qifa Ke, Michael Isard, and Svetlana Lazebnik, in "A multi-view embedding space for modeling internet images, tags, and their semantics", *International Journal of Computer Vision,* 106(2):210-233, 2014. As Gong et al describe, Canonical Correlation Analysis (CCA) is a "technique that maps two view, given by visual and textual features, into a common latent space where the correlation between the two views is maximized." The latent space is "cross-modal, in the sense that embedded vectors representing visual and textual information are treated as the same class of citizens and thus image-to-image, text-to-image, and image-to-text retrieval tasks can in principle all be handled in exactly the same way." Gong et al. describe a modified KCCA technique in which a scalable approximation scheme based on efficient explicit kernel mapping is employed followed by linear dimensionality reduction and linear CCA. A benefit of using KCCA to perform image feature detection is that it can address the problem of missing tags as noted above. With KCCA, a tag missing for an image may come from another image.

The tags for the images are modeled, as shown at 502, as a Bag of Words. The Bag of Words model is commonly used in methods of document classification where the frequency of occurrence of each word is used as a feature for training a classifier. The Bag of Words model is a simplifying representation used in natural language processing and information retrieval and in this model, a portion of text (such as a sentence or a document) is represented as the bag (multiset) of its words, and disregarding grammar and even word order but retaining multiplicity.

At 504 dimensionality reduction is performed on those tags using Principal Component Analysis (PCA) to reduce the number of random variables under consideration. PCA is a statistical procedure that uses an orthogonal transformation to convert a set of observations of possibly correlated variables into a set of values of linearly uncorrelated variables called principal components. The number of principal components is less than or equal to the number of original variables. This transformation is defined in such a way that the first principal component has the largest possible variance, that is, it accounts for as much of the variability in the data as possible, and each succeeding component in turn has the highest variance possible under the constraint that it is orthogonal to the preceding components. The resulting vectors are an uncorrelated orthogonal basis set. PCA is generally sensitive to the relative scaling of the original variables.

A Convolutional Neural Network (CNN) is then employed at 506 to identify image features. A CNN models animal visual perception, and can be applied to visual recognition tasks. CNN's are a type of feed-forward artificial neural network in which the connectivity pattern between the neurons is inspired by the organization of the animal visual cortex. In a CNN, individual cortical neurons in the network respond to stimuli in a restricted region of space known as the receptive field. The receptive fields of different neurons partially overlap such that they tile the visual field. The response of an individual neuron to stimuli within its receptive field is approximated mathematically by a convolution operation. The CNN must be pre-trained on an image set in order to identify image features. An example of such a technique is described by Chen Fang, Hailin Jin, Jianchao Yang, and Zhe Lin in "Collaborative feature learning from social media", *The IEEE Conference on Computer Vision and Pattern Recognition (CVPR),* June 2015. Fang et al. describe a paradigm for data driven image feature learning called collaborative feature learning which learns image features from user behavior data on social media. This is done by collecting user behavior data on social media to identify latent representations of individual images and learn a feature transformation from the images in the identified latent representations.

Once images features are identified, image extraction at 508 is performed by preparing a user item view matrix for collaborative filtering. At 510, matrix factorization is performed on the user-item view matrix to generate image latent factors. Matrix factorization is a factorization of a matrix into a product of matrices. In this case the two matrices are a user latent matrix and an image latent matrix. The image latent matrix contains image latent factors, and the user latent matrix contains user preference factors. In statistics, latent variables (as opposed to observable variables), are variables that are not directly observed but are rather inferred (through a mathematical model) from other variables that are observed (directly measured). These images are clustered at 512 into C, pseudo classes using K-means clustering which operates to partition n observations into C pseudo classes in which each observation belongs to the pseudo class with the nearest mean, serving as a prototype of the pseudo class. At 514, the CNN is trained on images for these pseudo classes. This permits capture of both the user's visual interest and image properties. At 516, a Radial Basis Function (RBF) kernel is applied over these image features. The RBF kernel provides a useful similarity measure as the value of the RBF kernel decreases with distance and ranges between zero (in the limit) and one (when x=x'). At 518, the tag features and image features are then projected in the same latent space using KCCA. If $Trends_t$ is a set of trend clusters for the $t^{th}$ epoch and $T \in Trends_t$ is some trend cluster, then let f(T) be its feature vector. Let for an image i, $x_i$ be image features after applying RBF kernel and $y_i$ be tag features from PCA for some image, i. Transformation matrices $W_x$ and $W_y$ are learned, which projects the image and tag features in the same space. The objective function for this formulation is given below where the aim is to minimize distance between tags and image pairs.

$$\min_{W_x, W_y} \sum_{i=1}^{N} \|W_x x_i - W_y y_i\|^2$$

This optimization problem reduces to a generalized eigenvalue problem. That is:

$$\begin{pmatrix} S_{xx} & S_{xy} \\ S_{yx} & S_{yy} \end{pmatrix} \begin{pmatrix} W_x \\ W_y \end{pmatrix} = \lambda \begin{pmatrix} S_{xx} & 0 \\ 0 & S_{yy} \end{pmatrix} \begin{pmatrix} W_x \\ W_y \end{pmatrix}$$

where,
$S_{xy}$ ($=S_{yx}$) is a cross-variance matrix for X=[x], Y=[y], $S_{xx}$ is a co-variance matrix for X, and
$S_{yy}$ is a co-variance matrix for Y.

To summarize, to get representative images for a trend cluster, a Bag of Words model is generated on the given cluster tags and PCA is applied over the model. The cluster feature vector is projected to the latent space. Images having maximum cosine similarity score are then chosen. Cosine similarity is a particularly useful technique to provide measure of how similar two documents (or images) are likely to be in terms of their subject matter.

Figure 6:
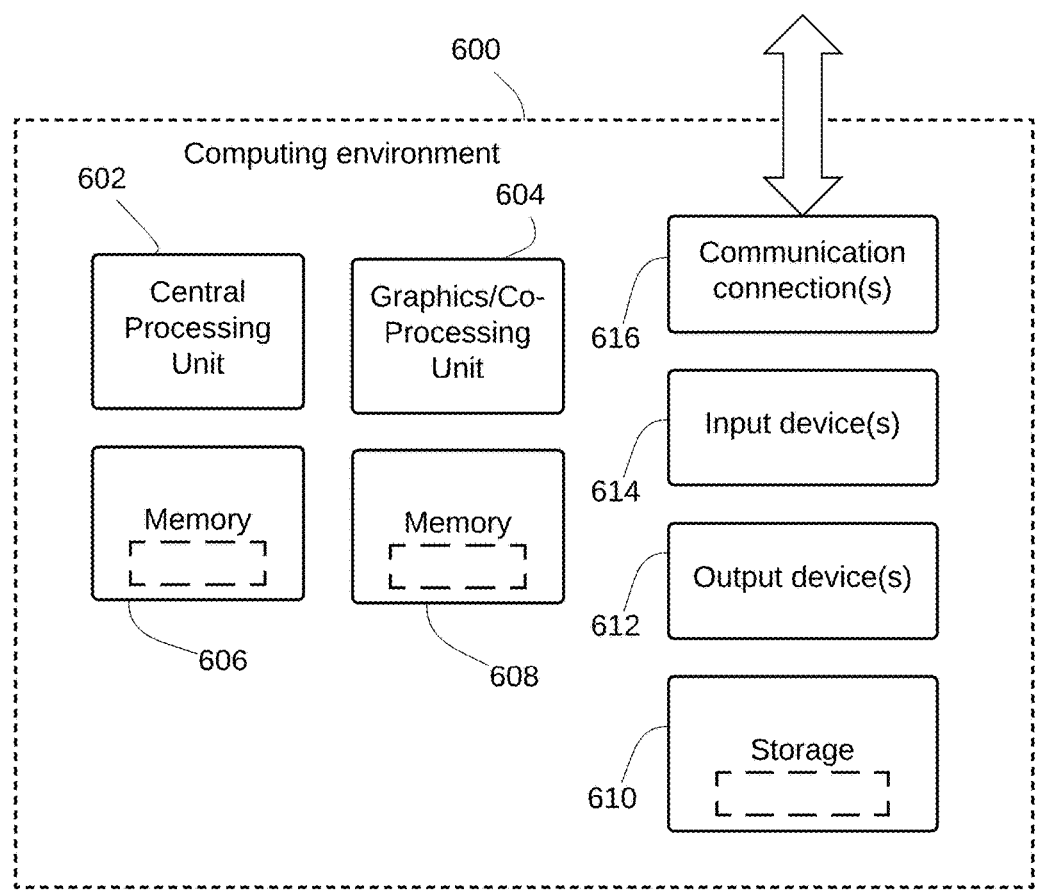
FIG. 6 illustrates a block diagram of hardware that may be employed in various embodiments.

FIG. 6 depicts a generalized example of a suitable general purpose computing system 600 in which the described innovations may be implemented in order to improve the processing speed and efficiency with which the computing system 600 provides trend detection and characterization. With reference to FIG. 6, the computing system 600 includes one or more processing units 602, 604 and memory 606, 608. The processing units 602, 606 execute computer-executable instructions. A processing unit can be a general-purpose central processing unit (CPU), processor in an application-specific integrated circuit (ASIC) or any other type of processor. The tangible memory 606, 608 may be volatile memory (e.g., registers, cache, RAM), non-volatile memory (e.g., ROM, EEPROM, flash memory, etc.), or some combination of the two, accessible by the processing unit(s). The hardware components in FIG. 6 may be standard hardware components, or alternatively, some embodiments may employ specialized hardware components to further increase the operating efficiency and speed with which the system 100 operates.

Computing system 600 may have additional features such as for example, storage 610, one or more input devices 614, one or more output devices 612, and one or more communication connections 616. An interconnection mechanism (not shown) such as a bus, controller, or network interconnects the components of the computing system 600. Typically, operating system software (not shown) provides an operating system for other software executing in the computing system 600, and coordinates activities of the components of the computing system 600.

The tangible storage 610 may be removable or non-removable, and includes magnetic disks, magnetic tapes or cassettes, CD-ROMs, DVDs, or any other medium which can be used to store information in a non-transitory way and which can be accessed within the computing system 600. The storage 610 stores instructions for the software implementing one or more innovations described herein.

The input device(s) 614 may be a touch input device such as a keyboard, mouse, pen, or trackball, a voice input device, a scanning device, or another device that provides input to the computing system 600. For video encoding, the input device(s) 614 may be a camera, video card, TV tuner card, or similar device that accepts video input in analog or digital form, or a CD-ROM or CD-RW that reads video samples into the computing system 600. The output device(s) 612 may be a display, printer, speaker, CD-writer, or another device that provides output from the computing system 600.

The communication connection(s) 616 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or another carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

FIGS. 7A, 7B, and 7C are pictorial diagrams illustrating an example of a user 101 interacting with embodiments disclosed herein. As seen in FIG. 7A, a user selects at 702 by way of a graphical user interface a creative field, via for example, mouse inputs. The system 100 provides the user with a listing of the various creative fields available by the system in a plurality of formats, such as the fields that are currently popular 704, and an exhaustive alphabetical listing 706. Once the user has selected a creative field, in this case, Print Design, the system 100 as shown in FIG. 7B, provides the available epochs 708 for the selected creative field. As seen at 708, each epoch spans a period of one-half of a calendar month. The user in this example, selects the epoch corresponding to the $2^{nd}$ half of November. The system 100 responds by providing to the user the trends detected in the selected epoch ($2^{nd}$ half of November) for the selected creative field (Print Design). As seen in FIG. 7B, the system 100 provides three detected trends: christmas xmas gift 710, media studio layout 711, clean animals color 712. Other trends may have been detected but in this example the system provides the three highest scoring trends on the screen shown. The user may select one of the displayed trends to see deeper insights for the selected trend. In the example shown in FIG. 7C, the user selected the trend christmas xmas gift 710 in FIG. 7B. The system 100 provides a variety of information, including images representative of the trend 714 and important tags and keywords related to the trend and a graphically depicted time-series of those tags 716.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer implemented method for detecting one or more trends in media content, comprising:
   retrieving, from a data storage device, tags respectively associated with instances of media content, each tag describing a respective instance of the media content;
   generating a temporal tag graph having nodes connected by edges to which edge weights are applied, the nodes respectively representing the tags over a plurality of time periods, the edges respectively representing temporal correlations among the nodes, and the edge weights respectively representing trend scores;
   generating a set of identified trends for a set of time periods by grouping the nodes from the temporal tag graph into clusters;
   identifying, for an identified trend in the set of identified trends, a representative image by performing operations comprising:
   generating, for a cluster from the temporal tag graph, a cluster feature vector from a set of tags in the cluster;

projecting the cluster feature vector and an image feature vector of an image into a common feature space;
selecting the image as the representative image based on distance between the cluster feature vector and the image feature vector in the common feature space; and
retrieving, from the data storage device and responsive to a selection input in a graphical interface, the identified trends and the representative image, and
updating the graphical interface to concurrently display the representative image and data indicative of the identified trend.

2. The computer implemented method set forth in claim 1 further comprising:
characterizing the set of the identified trends by generating a label for each trend.

3. The computer implemented method set forth in claim 1 further comprising:
characterizing the set of the identified trends by scoring each trend of the set of the identified trends.

4. The computer implemented method set forth in claim 1 further comprising:
characterizing the set of the identified trends by categorizing the set of the identified trends into a plurality of categories.

5. The computer implemented method set forth in claim 1, wherein the temporal correlations indicates a relation between a set of two tags and associated contextual information between the set of two tags.

6. The computer implemented method set forth in claim wherein grouping the nodes in the temporal tag graph employs Markov clustering comprising alternating between an expansion operation and an inflation operation on nodes of the temporal tag graph to generate the set of identified trends.

7. The computer implemented method set forth in claim 1 further comprising:
detecting changes in the set of identified trends over the plurality of time periods; and
identifying, between a first of the time periods and a subsequent time period, one or more of a trend emergence, a trend merging, a trend splitting into multiple trends, and a trend termination.

8. The computer implemented method set forth in claim 1, wherein the media content comprises a still image.

9. The computer implemented method set forth in claim 1, wherein the edge weights indicate co-occurrence of a pair of tags and association between the pair of tags in a given time period.

10. A computer system comprising:
data storage containing tags respectively associated with instances of media content, each tag describing a respective instance of the media content; and
a processor operatively coupled to the data storage, the processor configured to execute instructions that, when executed, cause the processor to perform operations comprising:
generating a temporal tag graph having nodes connected by edges to which edge weights are applied, the nodes respectively representing the tags over a plurality of time periods, the edges respectively representing temporal correlations among the nodes, and the edge weights respectively representing trend scores,
generating a set of identified trends for a set of time periods by grouping the nodes from the temporal tag graph into clusters,
identifying, for an identified trend in the set of identified trends, a representative image by performing additional operations comprising:
(a) generating, for a cluster from the temporal tag graph, a cluster feature vector from a set of tags in the cluster,
(b) projecting the cluster feature vector and an image feature vector of an image into a common feature space, and
(c) selecting the image as the representative image based on distance between the cluster feature vector and the image feature vector in the common feature space,
retrieving, from the data storage and responsive to a selection input in a graphical interface, the identified trend and the representative image, and
updating the graphical interface to concurrently display the representative image and data indicative of the identified trend.

11. The computer system of claim 10, the operations further comprising:
generating the trend scores for the set of identified trends, respectively, wherein a trend score is generated as a function of (i) changes in references over the set of time periods in a semantic representation of tags associated with an identified trend, and (ii) relative changes in references over the set of time periods in the semantic representation;
ranking the set of identified trends based on the trend scores; and
characterizing the set of identified trends by employing at least a characterization metric, the characterization metric comprising labeling each trend of the set of identified trends with a textual label.

12. The computer system of claim 11, the operations further comprising characterizing the set of identified trends by employing an additional characterization metric, the additional characterization metric comprising generating a trending score indicative of popularity of a trend in the set of identified trends compared to other trends in the set of identified trends.

13. The computer system of claim 12, the operations further comprising characterizing the set of identified trends by employing a third characterization metric, the third characterization metric comprising identifying change of a subset of trends in the set of identified trends over time.

14. The computer system of claim 10, wherein grouping the nodes in the temporal tag graph employs Markov clustering that comprises alternating between an expansion operation and an inflation operation on the nodes of the temporal tag graph to generate the set of identified trends.

15. The computer system of claim 10, the operations further comprising:
detecting changes in the set of identified trends over the plurality of time periods; and
identifying, between a first of the time periods and a subsequent time period, one or more of a trend emergence, a trend merging, a trend splitting into multiple trends, and a trend termination.

16. A non-transitory computer-readable medium having executable instructions stored thereon that, when executed by one or more processing devices, configure the one or more processing devices to perform operations comprising:

retrieving, from a data storage device, tags respectively associated with instances of media content, each tag describing a respective instance of the media content;

generating a temporal tag graph having nodes connected by edges to which edge weights are applied, the nodes respectively representing the tags over a plurality of time periods, the edges respectively representing temporal correlations among the nodes, and the edge weights respectively representing trend scores;

generating a set of identified trends for a set of time periods by grouping the nodes from the temporal tag graph into clusters;

identifying, for an identified trend in the set of identified trends, a representative image by performing additional operations comprising:

(a) generating, for a cluster from the temporal tag graph, a cluster feature vector from a set of tags in the cluster, (b) projecting the cluster feature vector and an image feature vector of an image into a common feature space, and (c) selecting the image as the representative image based on distance between the cluster feature vector and the image feature vector in the common feature space, retrieving, from the data storage device and responsive to a selection input in a graphical interface, the identified trend and the representative image; and updating the graphical interface to concurrently display the representative image and data indicative of the identified trend.

17. The non-transitory computer-readable medium of claim 16, the operations further comprising:

generating the trend scores for the set of identified trends, respectively, wherein a trend score is generated as a function of (i) changes in references over the set of time periods in a semantic representation of tags associated with an identified trend, and (ii) relative changes in references over the set of time periods in the semantic representation;

ranking the set of identified trends based on the trend scores; and characterizing the set of identified trends by employing at least a characterization metric, the characterization metric comprising labeling each trend of the set of identified trends with a textual label.

18. The non-transitory computer-readable medium of claim 17, the operations further comprising characterizing the set of identified trends by employing an additional characterization metric, the additional characterization metric comprising generating a trending score indicative of popularity of a trend in the set of identified trends compared to other trends in the set of identified trends.

19. The non-transitory computer-readable medium of claim 18, the operations further comprising characterizing the set of identified trends by employing a third characterization metric, the third characterization metric comprising identifying change of a subset of trends in the set of identified trends over time.

20. The non-transitory computer-readable medium of claim 16, wherein grouping the nodes in the temporal tag graph employs Markov clustering that comprises alternating between an expansion operation and an inflation operation on the nodes of the temporal tag graph to generate the set of identified trends.

* * * * *